United States Patent
Ichikawa et al.

(10) Patent No.: US 9,714,125 B2
(45) Date of Patent: Jul. 25, 2017

(54) CHECK VALVE AND CONTAINER WITH CHECK VALVE

(71) Applicant: Hosokawa Yoko Co., Ltd., Tokyo (JP)

(72) Inventors: Toru Ichikawa, Tokyo (JP); Tsutomu Hara, Tokyo (JP); Tomio Tahara, Saitama (JP)

(73) Assignee: HOSOKAWA YOKO CO., LTD., Tokyo (JP)

( * ) Notice: Subject to any disclaimer, the term of this patent is extended or adjusted under 35 U.S.C. 154(b) by 0 days.

(21) Appl. No.: 14/652,409

(22) PCT Filed: Dec. 17, 2013

(86) PCT No.: PCT/JP2013/083750
§ 371 (c)(1),
(2) Date: Jun. 15, 2015

(87) PCT Pub. No.: WO2014/098079
PCT Pub. Date: Jun. 26, 2014

(65) Prior Publication Data
US 2015/0321806 A1    Nov. 12, 2015

(30) Foreign Application Priority Data

Dec. 18, 2012  (JP) .................. 2012-275547
Dec. 18, 2012  (JP) .................. 2012-275556

(51) Int. Cl.
*B65D 37/00*    (2006.01)
*B65D 51/16*    (2006.01)
(Continued)

(52) U.S. Cl.
CPC .......... *B65D 51/16* (2013.01); *B65D 47/2062* (2013.01); *B65D 75/5883* (2013.01); *F16K 15/14* (2013.01); *Y10T 137/7043* (2015.04)

(58) Field of Classification Search
CPC .............. B65D 51/16; B65D 47/2075; B65D 47/2062; B65D 75/5872; B65D 47/2018;
(Continued)

(56) References Cited

U.S. PATENT DOCUMENTS 2,483,656 A * 10/1949 Marschalk ............. A61O 5/068
126/85 R
2,857,981 A * 10/1958 Koike .................... D05B 71/00
112/256
(Continued)

FOREIGN PATENT DOCUMENTS

CN    1224488 A    7/1999
CN    1468190 A    1/2004
(Continued)

OTHER PUBLICATIONS

JP2000254576—English Translation, machine generated, Feb. 2017.*
(Continued)

*Primary Examiner* — J. Casimer Jacyna
*Assistant Examiner* — Benjamin R Shaw
(74) *Attorney, Agent, or Firm* — Quarles & Brady LLP

(57) ABSTRACT

A check valve 1 includes a housing member 10 inside which a fluid passage is formed, and a valve member 20 disposed inside the member 10. A valve seat part 11 is provided on an inner circumference surface of the member 10, the valve member 20 includes a valve disk 21 seated in a sealable manner on a seat surface 11*a* of the valve seat part 11, a pressing member 22 supported with the member 10 and pressing the valve disk 21 on the seat surface 11*a*, and a valve driving member 23 connected to the valve disk 21 and driving the valve disk 21 against pressing force of the pressing member 22, and an operating member 30 configured to be capable of operating the valve driving member 23
(Continued)

such that the valve disk 21 of the valve member 20 moves apart from the seat surface 11a is provided.

4 Claims, 19 Drawing Sheets

(51) Int. Cl.
    *F16K 15/14*     (2006.01)
    *B65D 75/58*     (2006.01)
    *B65D 47/20*     (2006.01)

(58) Field of Classification Search
    CPC ............... B65D 47/2081; F16K 15/14; Y10T 137/7043; A46B 11/0041
    USPC ....... 222/213, 212, 495, 496, 511, 518, 513, 222/514; 251/226, 227, 244, 342
    See application file for complete search history.

(56) References Cited

U.S. PATENT DOCUMENTS

| | | | | |
|---|---|---|---|---|
| 3,087,656 | A | * | 4/1963 | Dougherty ............ B65D 47/18 222/213 |
| 3,107,035 | A | * | 10/1963 | Cholet .................. B65D 47/18 222/213 |
| 3,372,426 | A | * | 3/1968 | Schwartzman .... A46B 11/0041 132/308 |
| 4,541,552 | A | * | 9/1985 | Scheithauer ............ G01F 11/00 222/453 |
| 4,867,593 | A | * | 9/1989 | Kurokawa ......... B65D 47/2062 222/212 |
| 5,248,212 | A | * | 9/1993 | Lhuisset .............. A45D 34/043 222/213 |
| 5,971,648 | A | * | 10/1999 | Koreska ................. B43M 11/08 401/259 |
| 6,039,301 | A | | 3/2000 | Westerhof |
| 6,409,406 | B1 | * | 6/2002 | Schwartzman ........ B43M 11/06 222/209 |
| 6,886,807 | B1 | * | 5/2005 | Gill .......................... F16K 7/00 251/342 |
| 7,959,045 | B2 | | 6/2011 | Kuge et al. |
| 2005/0028870 | A1 | | 2/2005 | Danby et al. |
| 2008/0063319 | A1 | * | 3/2008 | Kuge ................. B65D 47/2075 383/33 |
| 2010/0155401 | A1 | * | 6/2010 | Cook ................... B65D 47/243 220/203.01 |

FOREIGN PATENT DOCUMENTS

| | | | |
|---|---|---|---|
| CN | 2651554 | Y | 10/2004 |
| DE | 3742297 | C1 | 8/1989 |
| EP | 1676784 | A1 | 7/2006 |
| FR | 1434743 | A | 4/1966 |
| GB | 2327932 | A | 2/1999 |
| JP | S623449 | | 1/1987 |
| JP | S63122676 | U | 8/1988 |
| JP | H0212314 | U | 1/1990 |
| JP | 2000084042 | A | 3/2000 |
| JP | 2000254576 | A * | 9/2000 |
| JP | 2004059071 | A | 2/2004 |
| JP | 2006076615 | A | 3/2006 |
| JP | 2009196695 | A | 9/2009 |
| WO | 8905107 | A1 | 6/1989 |
| WO | 2006028139 | A1 | 3/2006 |

OTHER PUBLICATIONS

The State Intellectual Property Office of China, First Office Action, Application No. 201380066478.8, Jun. 30, 2016.
Australian Government, IP Australia, Patent Examination Report No. 1, Application No. 2013365035, Nov. 1, 2016.
European Patent Office, Extended European Search Report, Application No. 13863715.2, Sep. 28, 2016.
Japan Patent Office, Office Action, Application No. 2012-275556, Sep. 2, 2016.
Japan Patent Office, Office Action, Application No. 2012-275547, Sep. 9, 2016.
Japan Patent Office, Notification of Reason for Rejection, Application No. 2012-275556, Mar. 14, 2017.

* cited by examiner

CHECK VALVE AND CONTAINER WITH CHECK VALVE

CROSS-REFERENCE TO RELATED APPLICATIONS

This application represents the national stage entry of PCT International Application No. PCT/JP2013/083750 filed on Dec. 17, 2013 and is based upon and claims the benefit of priority from Japanese Patent Application No. 2012-275547, filed on Dec. 18, 2012, and Japanese Patent Application No. 2012-275556, filed on Dec. 18, 2012, the entire contents of all of which are incorporated herein by reference.

TECHNICAL FIELD

The present invention relates to a check valve and a container with a check valve, and more specifically, a check valve for pouring out contents inside a container and a container with a check valve in which the check valve is fitted to its spouting part.

BACKGROUND ART

With recent spread of a spout pouch, which is a packaging bag (pouch) to which a spout is attached, the spout pouch has been filled with various contents. Among the various contents filling such a spout pouch, for example, soy sauce, edible oil, liquor or the like is preferably prevented from being exposed to oxygen in the air in order to avoid deterioration due to oxidation. Accordingly, for the above contents, a spout pouch having a check valve mechanism has been demanded because it does not suck the outside air just after pouring out the contents.

Various containers with the check valve have been conventionally developed. In most of the containers with the check valve, contents are poured out by pressure applied to the container itself. That is, at the time of pouring out the contents, the container itself is pressed with a hand to increase the internal pressure of the container, so that the valve is opened by pressure of the contents and thereby the contents are poured out from the container. On the other hand, at the time of stopping the pouring out of the contents, the pressing on the container is stopped. Thereby, the container tends to return to its original shape, so that it generates depressurizing force that sucks the valve toward an inside of the container, and thus the valve is closed.

The mechanism described above functions well in the case where the container is made of a relatively hard material such as a blow bottle. However, in the case where the container is made of an extremely soft and thin laminated film or the like such as the spout pouch, even if the pressing on the container is stopped, the depressurizing force described above is hardly generated. Therefore, the valve is difficult to close, which causes a state that the pouring out the contents is not stopped well, and they drip from the port.

There is disclosed a check valve having a mechanism that closes a valve using restoring force of a coil spring, as a conventional check valve applicable to even the container such as a packaging bag (Patent Literature 1).

In the case of the check valve of this type, at the time of pouring out contents, the container is pressed and the valve is opened by pressure of the contents, like the check valve described above. On the other hand, at the time of stopping the pouring out of the contents, the pressing on the container is stopped. Thereby, the valve is closed by the restoring force of the coil spring.

Note that in Patent Literature 2, there is disclosed an infusion container in which a medical container and a flexible container are integrally formed, but the check valve is not described at all.

CITATION LIST

Patent Literature

Patent Literature 1: Japanese Patent Laid-Open No. 2006-76615
Patent Literature 2: Japanese Patent Laid-Open No. 2000-84042

SUMMARY OF INVENTION

Technical Problem

However, in the case of the check valve using the coil spring in Patent Literature 1, the following many problems arise.

First, in the conventional check valve, at the time of pouring out the contents, the valve needs to be opened by the pressure of the contents by pressing the container itself with the hand to increase the internal pressure of the container. The opening of the check valve needs to be maintained, and also a flow rate needs to be controlled by balancing the pressure applied to the contents with the returning force of the coil spring of the check valve. Therefore, if the force of the coil spring is too strong, the check valve is unstably switched between a full opening state and a full closing state. Conversely, if the force of the coil spring is too weak, liquid dripping is generated when the stopping of the pouring out is desired, which causes a state that the pouring out the contents is not stopped well.

Further, in the conventional check valve, since the coil spring is in contact with the contents, components of the contents are deposited on the coil spring, so that there is a problem that a function of the spring lowers. For example, in the case where the contents are soy sauce, liquor or the like, components contained in the contents, such as salt, sugar or the like are easily gathered around the coil spring. In the case where gaps of the coil spring are filled with the deposit, the contents may not be poured out.

Further, it is desirable that a metal coil spring be used in order to obtain desired restoring force, but in this case, rust may be generated on the coil spring due to moisture, salt or the like of the contents. Especially, in the case where the contents are food, rust generation cannot be allowed.

Meanwhile, in the case where a plastic coil spring is used, it is difficult to obtain the desirable restoring force. Even though it is possible to increase the restoring force to some extent by making the coil spring thicker, it occupies a larger space inside the spout having a predetermined internal diameter, so that there is a problem that a pouring amount or a pouring speed of the contents decreases.

The present invention has been made based on the above described technical understanding and an object thereof is to provide a check valve and a container with a check valve which can effectively prevent sucking of the outside air and dripping of contents, and also can freely adjust a pouring amount or a pouring speed of the contents.

Solution to Problem

A check valve according to one aspect of the present invention includes: a housing member inside which a fluid passage is formed; and a valve member disposed inside the housing member, the housing member including a valve seat part provided on an inner circumference surface of the housing member, the valve member including a valve disk seated in a sealable manner on a seat surface of the valve seat part, a pressing member supported with the housing member and biasing the valve disk toward the seat surface of the valve seat part, and a valve driving member connected to the valve disk and driving the valve disk against pressing force of the pressing member, and an operating member configured to be capable of operating the valve driving member such that the valve disk of the valve member moves apart from the seat surface of the valve seat part being provided.

Further, in the check valve, the valve driving member may include a pressing piece, and a shaft extending from the pressing piece toward the valve disk to be connected to the valve disk, the operating member may include a pair of flap parts facing each other supported with the housing member through hinge parts, and the pair of flap parts may include inclined parts sandwiching the pressing piece and allowing the pressing piece to slide.

A check valve according to one aspect of the present invention includes: a housing member inside which a fluid passage is formed; and a valve member disposed inside the housing member, the housing member including a valve seat part provided on an inner circumference surface of the housing member, the valve member including a valve disk seated in a sealable manner on a seat surface of the valve seat part, a pressing member supported with the housing member and biasing the valve disk toward the seat surface of the valve seat part, and a valve driving member connected to the valve disk, and the valve driving member including a pressing piece extending from the housing member and driving the valve disk such that the valve disk moves apart from the seat surface against pressing force of the pressing member by force applied to the pressing piece.

Further, in the check valve, the pressing member may be at least two or more elastic members each having a columnar shape or a plate shape, one end of each elastic member being fixed to the housing member on a downstream side of the fluid passage and the other end of each elastic member being fixed to a peripheral portion of the valve disk, and the pressing member may bend to elastically move the valve disk apart from the seat surface of the valve seat part.

Further, in the check valve, the pressing member may be one elastic member having a columnar shape or a plate shape, one end of the elastic member being fixed to the housing member on a downstream side of the fluid passage and the other end of the elastic member being fixed to a peripheral portion of the valve disk, and the elastic member may be curved to elastically move the valve disk apart from the seat surface of the valve seat part with one side of the valve disk opened.

A container with the check valve according to one aspect of the present invention includes: a container body accommodating contents and including a spouting part; and the check valve according to the present invention, the housing member including a cylindrical mouth part, and a cylindrical conduct tube part connecting to the mouth part, and in the check valve, at least part of the conduct tube part of the housing member being fixed to the container body such that the mouth part of the housing member is exposed on the spouting part of the container body.

Advantageous Effect of Invention

A check valve according to the present invention includes an operating member configured to be capable of operating a valve driving member such that a valve disk pressed on a seat surface of a valve seat part with a pressing member moves apart from the seat surface. By operating the operating member, it is possible to freely adjust opening and closing condition of the valve disk through the valve driving member.

The check valve according to the present invention includes a pressing piece extending from a housing member, and the valve driving member driving the valve disk such that the valve disk moves apart from the seat surface against pressing force of the pressing member by force applied to the pressing piece. By operating the pressing piece with the fingers from an outside of a container body to which the check valve is attached, it is possible to freely adjust the opening and closing condition of the valve disk.

In this manner, according to the present invention, the valve is not opened by pressure of contents by pressing the container itself to increase the internal pressure like a conventional check valve, but the valve is opened by operating the valve driving member connected to the valve disk such that the valve driving member drives the valve disk against the pressing force of the pressing member. Therefore, even in the case of a container having small restoring force such as a pouch, it is possible to control the opening of the valve and the pressure of the contents independently, and freely adjust a pouring amount or a pouring speed of the contents.

In addition, at the time of pouring out the contents, it is not necessary to increase the pressure of the contents by pressing the container itself with the hand like the conventional check valve, and it is enough just to operate the operating member with the fingers, or operate the valve driving member with the fingers through the container body. Therefore, when the pouring amount of the contents is large, it is possible to easily pour out the desired amount of the contents.

Further, according to the present invention, the valve disk is driven with the valve driving member to move apart from the seat surface of the valve seat part only when the contents are poured out, and when the contents are not poured out, the valve disk is pressed on the seat surface, and thus the contents or the outside air cannot pass through the fluid passage inside the housing member. Accordingly, it is possible to effectively prevent entering of the outside air and dripping of the contents.

Further, according to the present invention, the pressing member is an elastic member having a columnar shape or a plate shape, one end of the elastic member being fixed to the housing member on a downstream side of the fluid passage and the other end of the elastic member being fixed to a peripheral portion of the valve disk, so that the pressing member does not occupy a space inside the spout and does not obstruct the contents passing through the fluid passage. Therefore, it is possible to prevent decrease of the pouring amount or the pouring speed of the contents. In addition, it is possible to prevent malfunction and a situation where the contents cannot be poured out, which are caused by components of the contents deposited on the pressing member, like a case where a coil spring is used.

Further, according to the present invention, the pressing member is provided on the downstream side of the fluid passage when viewed from the valve disk, and thus frequency of contacting between the pressing member including a spring portion and the contents is low. Accordingly, it is possible to prevent lowering of function of pressing the valve disk due to the deposited components of the contents.

Further, according to the present invention, the pressing member is a synthetic resin, so that it is possible to prevent rust or the like from being generated on the pressing member.

DESCRIPTION OF EMBODIMENTS

Figure 1:
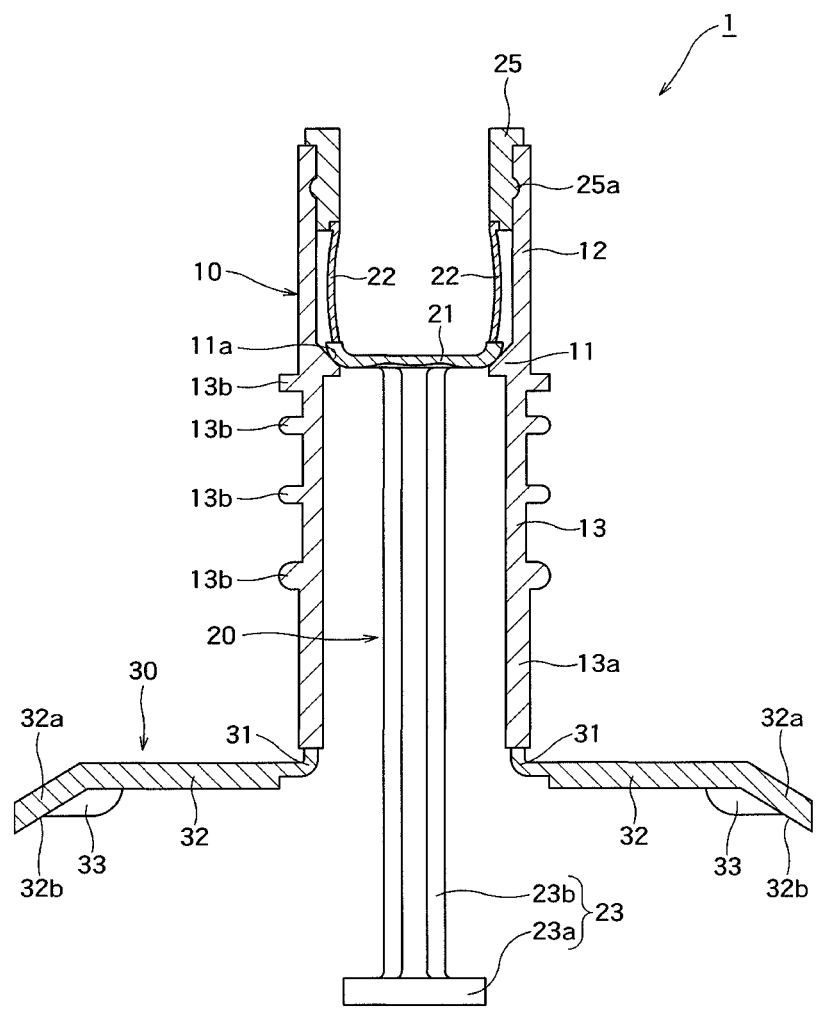
FIG. 1 is a cross sectional view of a part of a check valve according to a first embodiment of the present invention in a state that the valve is closed.

With reference to the drawings, hereinafter, description is given of check valves and containers with a check valve according to embodiments of the present invention. Note that in each of the figures, the same reference characters are given to constituent elements having similar functions, and detailed description of the constituent elements having the same characters is not repeated.

First Embodiment

Figure 2A:
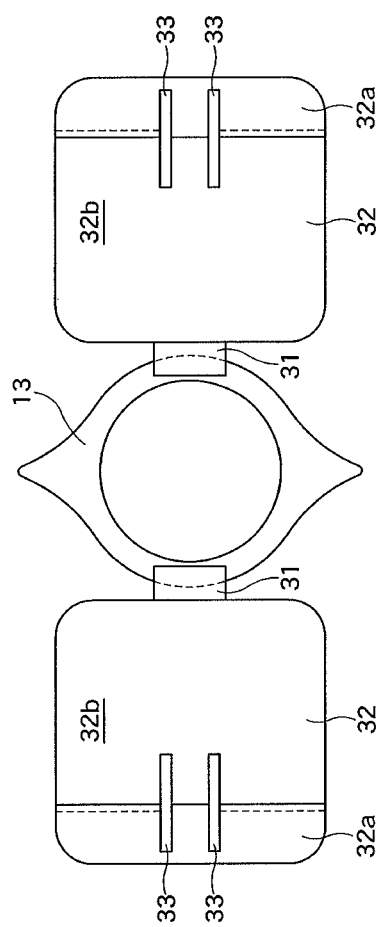
FIG. 2A is a bottom view of a housing member of the check valve according to the first embodiment of the present invention.
Figure 2B:
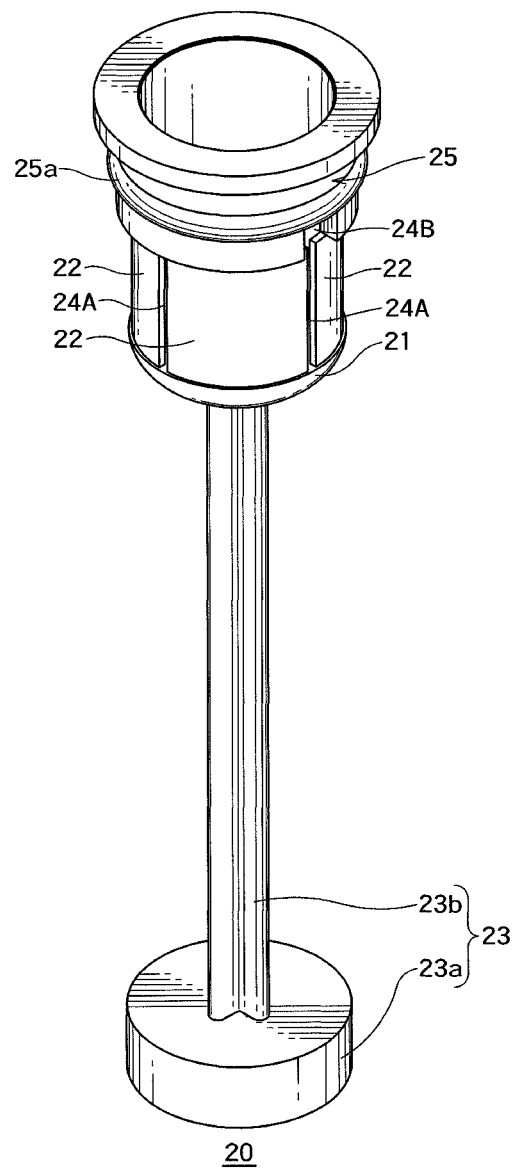
FIG. 2B is a perspective view of a valve member of a both end support type according to the first embodiment of the present invention.
Figure 3:
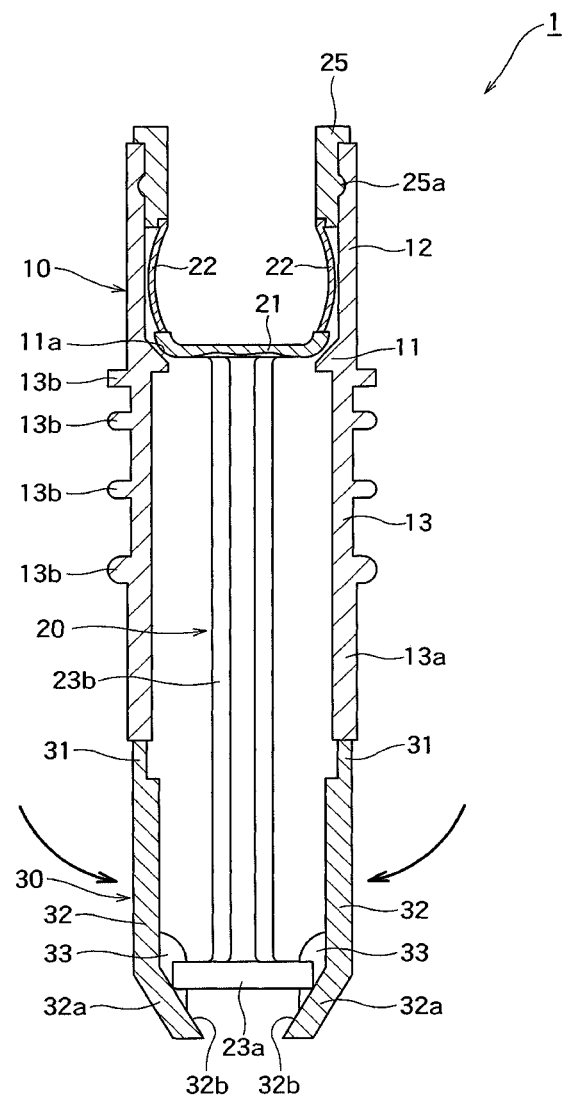
FIG. 3 is a cross sectional view of a part of the check valve according to the first embodiment of the present invention in a state that the valve is opened.

With reference to FIG. 1 to FIG. 3, description is given of a check valve according to a first embodiment. FIG. 1 is a cross sectional view of a part of the check valve 1 in a state that the valve is closed. FIG. 2A is a bottom view of a housing member 10 of the check valve. FIG. 2B is a perspective view of a valve member 20. Further, FIG. 3 is a cross sectional view of a part of the check valve 1 in a state that the valve is opened.

As illustrated in FIG. 1, the check valve 1 according to this embodiment includes the housing member 10, and the valve member 20 disposed inside the housing member 10.

More specifically, the housing member 10 includes a cylindrical mouth part 12, and a cylindrical conduct tube part 13 connected to the mouth part 12, and a fluid passage is formed inside the mouth part 12 and the conduct tube part 13. Note that, though not illustrated, a screw part on which a cap is screwed, may be provided on an outer circumference of the mouth part 12.

As illustrated in FIG. 1, a valve seat part 11 is provided on an inner circumference surface of the housing member 10. The valve seat part 11 is configured as a step part projecting from the inner circumference of the housing member 10 as illustrated in FIG. 1.

Note that the configuration of the valve seat part 11 is not limited to this. For example, by making an internal diameter of the mouth part 12 larger than an internal diameter of the conduct tube part 13, a portion where the mouth part 12 and the conduct tube part 13 are connected may be the valve seat part 11.

The valve seat part 11 includes a seat surface 11a on which a valve disk 21 is seated. The seat surface 11a is configured as an inclined surface having an inverted cone shape as illustrated in FIG. 1, but the seat surface 11a is not limited to this. That is, the seat surface 11a may has a shape that does not generate a gap between the valve disk 21 and the valve seat part 11 in a state that the valve disk 21 is seated on the valve seat part 11.

The valve disk 21 is seated on the valve seat part 11 when the valve member 20 is loaded inside the housing member 10, thereby preventing the valve member 20 from falling off, and also shutting out the flowing of the contents and the air.

The conduct tube part 13 includes an attachment part 13a fixed to the container body, and flange parts 13b extending outward at portions on an upper side of the attachment part 13a (downstream side of the fluid passage).

Note that the housing member 10 may be configured by combining a plurality of members, but preferably the housing member 10 is integrally molded with a synthetic resin such as polyethylene, polypropylene.

Further, a shape of the housing member 10 is not limited to the cylindrical shape as illustrated in FIG. 1, and, for example, it may be an L shape having a bent portion.

Next, description is given of a configuration of the valve member 20. As illustrated in FIG. 2B, the valve member 20 includes the valve disk 21, pressing members (biasing members) 22, and a valve driving member 23. More specifically, the valve member 20 according to this embodiment is a valve member of a so-called both end support type in which the four pressing members 22 are provided.

Note that, the valve member 20 may be configured by combining a plurality of members, but preferably the valve member 20 is integrally molded with a synthetic resin such as polyethylene, polypropylene. Further, the valve member 20 including an engaging member 25 described later may be integrally molded with a synthetic resin.

The valve disk 21 is seated in a sealable manner on the seat surface 11a of the valve seat part 11.

The pressing members 22 are supported with the housing member 10. As illustrated in FIG. 1, in this embodiment, the pressing members 22 are fixed to a lower end of the engaging member 25.

Further, the pressing members 22 press the valve disk 21 on the seat surface 11a of the valve seat part 11. In other words, the pressing members 22 bias the valve disk 21 toward the seat surface 11a of the valve seat part 11. Note that, as illustrated in FIG. 1, the pressing members 22 may bend in a state that the valve is closed.

In this embodiment, the valve member 20 includes the four pressing members 22 each having a columnar shape or a plate shape. The pressing members 22 each are an elastic member. As illustrated in FIG. 1 and FIG. 2B, one end (upper end) of the pressing member 22 is fixed to the housing member 10 on the downstream side of the fluid passage, and the other end (lower end) of the pressing member 22 is fixed to a peripheral portion of the valve disk 21. More specifically, the pressing members 22 are fixed to the housing member 10 through the engaging member 25.

Further, as illustrated in FIG. 2B, a passing hole 24A through which the contents pass at the time of opening the valve is provided between the respective pressing members 22. In order to increase a flowing amount of the contents, a passing hole 24B communicating with the passing hole 24A may be provided on the engaging member 25.

Note that the pressing members 22 may be configured to have a cylindrical shape. In this case, the passing holes 24A are not provided and the contents are poured out through the passing hole 24B from an outside to an inside.

As illustrated in FIG. 2B, the engaging member 25 is a ring shape member, and is provided with a projection 25a on an outer circumference surface thereof. The projection 25a is engaged with a recess provided on the inner circumference of the housing member 10, so that the engaging member 25 is undetachably fixed to the housing member 10.

Note that the number of pressing members 22 and its shape (width, thickness and the like) can be appropriately selected depending on desired characteristics and contents properties. For example, in the case where increase of the pressing force (biasing force) is desired, it is enough to increase the number of pressing members 22, make the pressing member 22 thicker, or make the pressing member 22 wider. Meanwhile, in the case where decrease of the pressing force (biasing force) is desired, it is enough to decrease the number of pressing members 22, make the pressing member 22 thinner, or make the pressing member 22 narrower. By changing the number of pressing members 22 or its shape, a biasing effect can be adjusted. A size of the pressing member 22 is 5 mm to 8 mm in height, 3 mm to 8 mm in width, and 0.2 mm to 1 mm in thickness, as one example.

Further, the pressing member 22 is preferably made of a material other than metal, for example, a synthetic resin (polyethylene, polypropylene, or the like), from the viewpoint of preventing generation of rust or the like.

The valve driving member 23 drives the valve disk 21 against the pressing force of the pressing members 22, and is connected to the valve disk 21 as illustrated in FIG. 1. In this embodiment, the valve driving member 23 includes a pressing piece 23a, and a shaft 23b extending from the pressing piece 23a toward the valve disk 21 to be connected to the valve disk 21. The pressing piece 23a is sandwiched between a pair of flap parts 32 (described later). The pressing piece 23a preferably has a disk shape, but it may have other shapes such as a spherical shape.

Note that a transverse cross sectional shape of the shaft 23b is a cruciform shape in this embodiment, but it is not limited to this and it may be other shapes, such as a circular shape, a polygonal shape.

Next, description is given of an operating member 30 that operates the valve driving member 23. As illustrated in FIG. 1 and FIG. 2A, the operating member 30 is attached to a lower end of the housing member 10.

More specifically, the operating member 30 includes the pair of flap parts 32, 32 supported with the housing member 10 through hinge parts 31. The pair of flap parts 32, 32 are provided to face each other, and include inclined parts 32a sandwiching the pressing piece 23a of the valve driving member 23 and allowing the piece to slide. The pair of flap parts 32, 32 are configured to be like a pair of tweezers that can sandwich the pressing piece 23a.

The hinge parts 31 are deformably connected to a lower end of the conduct tube part 13 as illustrated in FIG. 1, and preferably configured as thin wall parts thinner than the housing member 10 and the flap parts 32.

Note that the hinge parts 31 are preferably have a certain amount of repulsive force to the pressing force applied to the flap parts 32 in order that the pressing piece 23a that has been pressed up easily returns to its original position.

In the flap part 32, ribs 33 may be provided on an inner surface 32b of the flap part 32 as illustrated in FIG. 1 and FIG. 2A. The ribs 33 come in contact with sides of the pressing piece 23a and guide moving of the pressing piece 23a when the pair of flap parts 32, 32 sandwich the pressing piece 23a. That is, by providing the ribs 33 on the flap part 32, the moving of the pressing piece 23a can be limited to upward and downward directions in FIG. 1, thereby improving operability of the pressing piece 23a (valve driving member 23) with the flap parts 32.

As illustrated in FIG. 1, in a state that the pair of flap parts 32 do not sandwich the pressing piece 23a, the valve disk 21 is pressed on the seat surface 11a of the valve seat part 11 with the pressing members 22, and thus the valve of the check valve 1 is closed. Note that the pressing members 22 may bend in a state that the valve is closed.

Next, with reference to FIG. 3, description is given of opening operation of the valve of the check valve 1.

At the time of opening the valve of the check valve 1, by pressing the pair of flap parts 32 from their both sides, the pressing piece 23a is sandwiched between the pair of flap parts 32. Further, when the pair of flap parts 32 are pressed, the pressing piece 23a is pressed upward while sliding along the inner surfaces 32b of the flap parts 32 as illustrated in FIG. 3. As the force applied to the flap parts 32 becomes larger, a moving amount of the pressing piece 23a increases.

The pressing piece 23a is driven in this manner with the operating member 30, so that the pressing members 22 bend to elastically move the valve disk 21 apart from the seat surface 11a of the valve seat part 11 as illustrated in FIG. 3. Thereby, a gap is generated between the valve disk 21 and the seat surface 11a, which enables the contents to pass through the fluid passage of the housing member 10.

A size of the gap between the valve disk 21 and the seat surface 11a can be changed depending on the force for pressing the flap parts 32. Further, by changing dimensions of the check valve 1, for example, an internal diameter of the housing member 10, a size of the pressing piece 23a (diameter or the like of the disk member), a length of the shaft 23b or the like, it is possible to change the size of the gap under the same pressing force condition.

Note that the pressing members 22 are not limited to the case where they are configured as the columnar shape or plate shape member, and they may be configured as a spiral spring member such as a coil spring. Even in the case of the coil spring, the coil spring is provided on the downstream side of the fluid passage when viewed from the valve disk 21, and thus frequency of contacting between the coil spring and the contents is low. Accordingly, as compared with the conventional configuration in which the coil spring is provided on the upstream side of the fluid passage when viewed from the valve disk, attachment of the deposit is suppressed, and thus the pressing function can be prevented from lowering.

Figure 4:
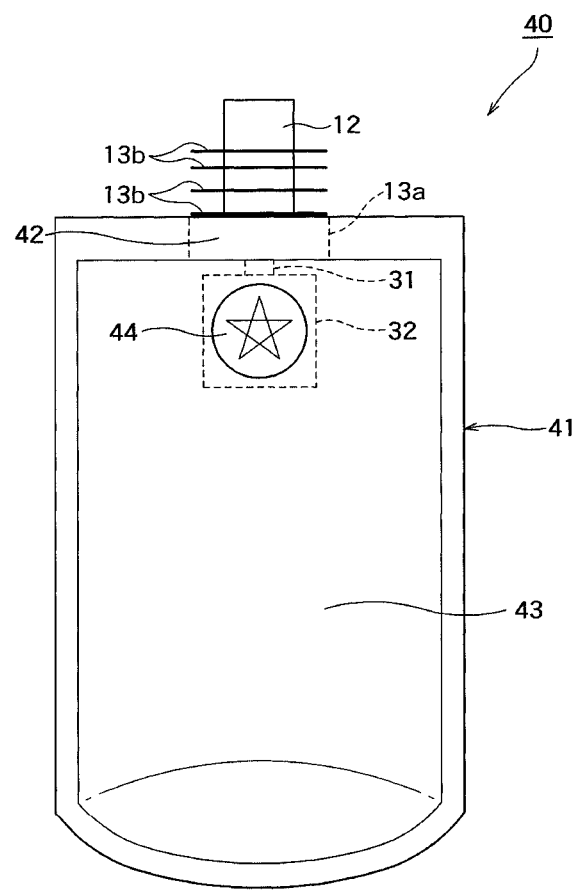
FIG. 4 is a front view of a container with a check valve according to one embodiment of the present invention.

Next, with reference to FIG. 4, description is given of a container with a check valve 40 including the above described check valve 1. FIG. 4 is a front view of the container with the check valve according to one embodiment.

The container with the check valve (spout pouch) 40 accommodates the contents, and includes a container body (pouch) 41 including a spouting part 42, and the above described check valve 1.

The container body 41 is preferably a pouch configured with a laminated film or the like, and a thickness thereof is, for example, 30 µm to 200 µm.

The laminated film includes a base material layer made of a synthetic resin such as polyethylene terephthalate, polypropylene, polyamide, ethylene vinyl alcohol copolymer. Further, in order to give a gas barrier property, a metallic foil may be used as an intermediate layer. Alternatively, a plastic film on which metal such as aluminum, magnesium or oxide such as silicon oxide is vapor-deposited, or a plastic film having a gas barrier coating layer may be used.

Further, in the laminated film, there is formed a thermally fused layer at a portion to be thermally fused. A material of this thermally fused layer is, for example, high density polyethylene, medium density polyethylene, low density polyethylene, linear low density polyethylene, polypropylene or the like.

The attachment part 13a of the housing member 10 is fused to the thermally fused layer, and thus a material of the attachment part 13a is preferably the same kind of resin as that of the thermally fused layer.

As illustrated in FIG. 4, the check valve 1 is thermally fused to the container body 41 to be fixed. More specifically, in the check valve 1, the attachment part 13a of the conduct tube part 13 is fixed to the container body 41 such that the mouth part 12 of the housing member 10 is exposed on the spouting part 42 of the container body 41.

Note that the check valve 1 is preferably fixed to the container body 41 such that the flap parts 32 are parallel to a main surface 43 of the container body 41 in order to facilitate the operation of the flap parts 32 through the container body 41.

Further, the container body 41 is not limited to the pouch as long as the operating member 30 can operate the valve driving member 23, and it may be any kind of container such as a blow bottle, a PET bottle, a paper container.

Further, an operation position displaying part 44 that indicates positions of the flap parts 32 may be provided on an outside surface of the container body 41 in order to further improve operability of the check valve, as illustrated in FIG. 4. The operation position displaying part 44 is provided, for example, by printing predetermined letters, patterns or the like on the outside surface of the container body 41, or by putting a member made of paper, cloth or the like on the outside surface of the container body 41.

Next, description is given of usage of the container with the check valve 40.

First, in the case where a cap (not illustrated) is attached to the mouth part 12, the cap is rotated to be removed while the joint portion (attachment part 13a) between the check valve 1 and the container body 41 is held with one hand. Next, one hand is attached to a side or bottom of the container body and the other hand holds the check valve 1 to turn the mouth part 12 toward a cup into which the contents are to be poured.

Then, the pair of flap parts 32, 32 are pressed from their both sides through the container body 41 with the fingers of the hand holding the check valve 1. Thereby, the valve disk 21 is pressed up against the pressing force of the pressing members 22, and the gap is generated between the valve disk 21 and the seat surface 11a of the valve seat part 11, so that the contents in the container body are poured into the cup. By adjusting the pressing force on the flap parts 32, it is possible to freely change a pouring amount or a pouring speed of the contents.

After the desired amount of the contents is poured out, pressing the pair of flap parts 32 is stopped. Thereby, the pressing piece 23a goes down to its original position, and the valve disk 21 returns to a state that it is seated on the valve seat part 11, so that the pouring out of the contents is stopped. Of course, the outside air is not sucked into the inside of the container body 41 at the time of closing the valve.

As described above, according to this embodiment, it is not necessary to apply pressure to the container body itself at the time of pouring out the contents. Therefore, even in the case where the container has large capacity (for example, 1 to 1.5 liters), it is possible to easily keep a state that the mouth part is turned toward the cup.

Further, according to this embodiment, by adjusting the pressing force on the flap parts, it is possible to freely change the pouring amount or the pouring speed of the contents. Therefore, even in the case of the small pouring amount, such as a case where the content is soy sauce, it is possible to easily adjust the pouring amount.

Further, according to this embodiment, even in the case of the container in which the internal pressure is not easily applied even if the container is pressed with the hand, such as the pouch, it is possible to easily change the pouring amount or the pouring speed of the contents.

Further, according to this embodiment, since the check valve structure uses restoring force of the pressing members, it is possible to prevent liquid dripping and entering of the outside air at the time of pouring out the contents.

Further, since the pressing members 22 are configured as the plate shape or columnar shape member, they do not obstruct the fluid passage inside the housing member 10. Therefore, the container with the check valve of the present invention is also suitable for a case where the pouring out at a relatively large flow rate is required, such as a case of drinks.

In this manner, according to this embodiment, it is possible to pour out the contents at the desired pouring amount or pouring speed far easily, as compared with the case of the conventional check valve in which the internal pressure of the container is increased by applying the pressure to the container itself with the hand, and the valve is opened by pressure of the contents.

Next, description is given of first to third modification examples of the check valve according to this embodiment. Either modification example can obtain the effect described above.

First Modification Example of First Embodiment

Figure 5:
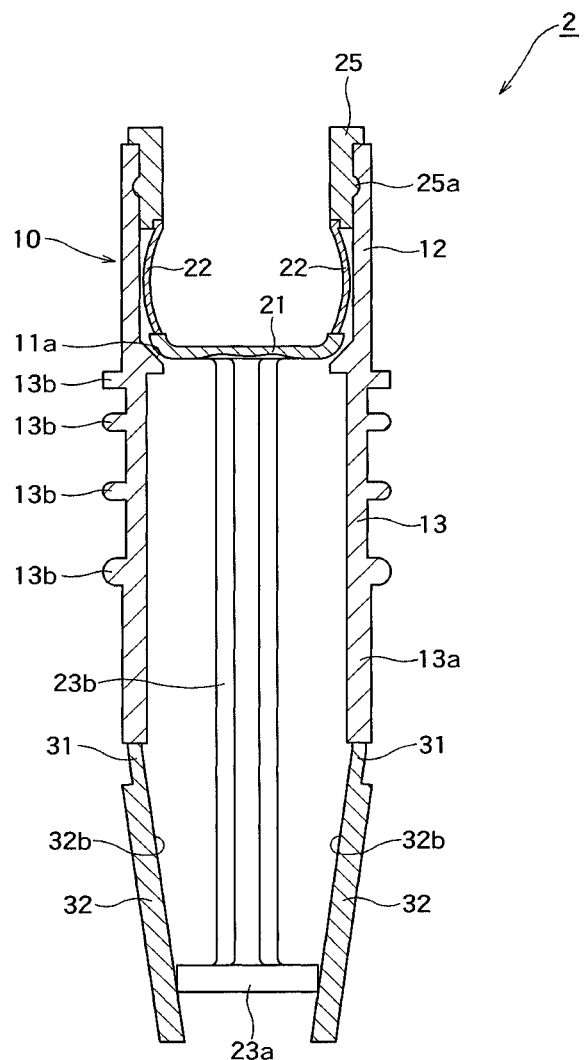
FIG. 5 is a cross sectional view of a part of a check valve according to a first modification example of the first embodiment of the present invention.

FIG. 5 is a cross sectional view of a part of a check valve 2 according to a first modification example. The check valve 2 is different from the above described check valve 1 only in the configuration of the flap part. In this modification example, flap part 32 does not include an inclined part 32a as illustrated in FIG. 5.

More specifically, in the check valve 2, the pair of flap parts 32, 32 are configured such that they slide a pressing piece 23a along inner surfaces 32b facing each other of the pair of flap parts 32, 32 in a state that they sandwich the pressing piece 23a of a valve driving member 23.

In this manner, the flap parts 32 do not need to include the inclined parts 32a as long as the inner surfaces 32b of the flap parts 32 form inclined surfaces in a state that the flap parts 32 sandwich the pressing piece 23a.

Second Modification Example of First Embodiment

Figure 6:
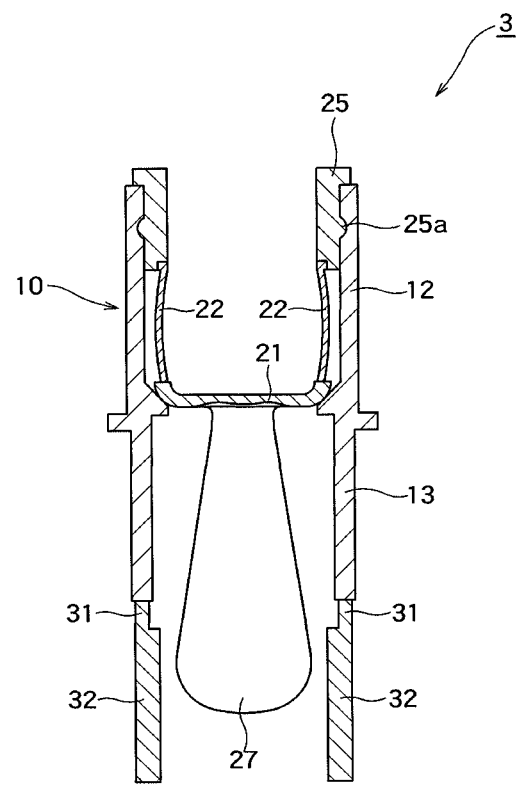
FIG. 6 is a cross sectional view of a part of a check valve according to a second modification example of the first embodiment of the present invention.

FIG. 6 is a cross sectional view of a part of a check valve 3 according to a second modification example. The check valve 3 is different from the above described check valve 1 mainly in the configuration of the valve driving member. As illustrated in FIG. 6, a valve driving member according this modification example does not include the above described shaft 23b, and is configured as a pressing piece 27 having a substantially waterdrop shape, an upper end of which is connected to a valve disk 21.

In this manner, by forming the pressing piece itself into the substantially waterdrop shape or a long columnar shape, the shaft 23b can be omitted.

Note that the shape of the pressing piece 27 in FIG. 6 is merely one example. That is, the shape of the pressing piece 27 may be any shape as long as the pressing piece can slide along inner surfaces 32b facing each other of a pair of flap parts 32, 32 sandwiching the pressing piece.

Third Modification Example of First Embodiment

Figure 7A:
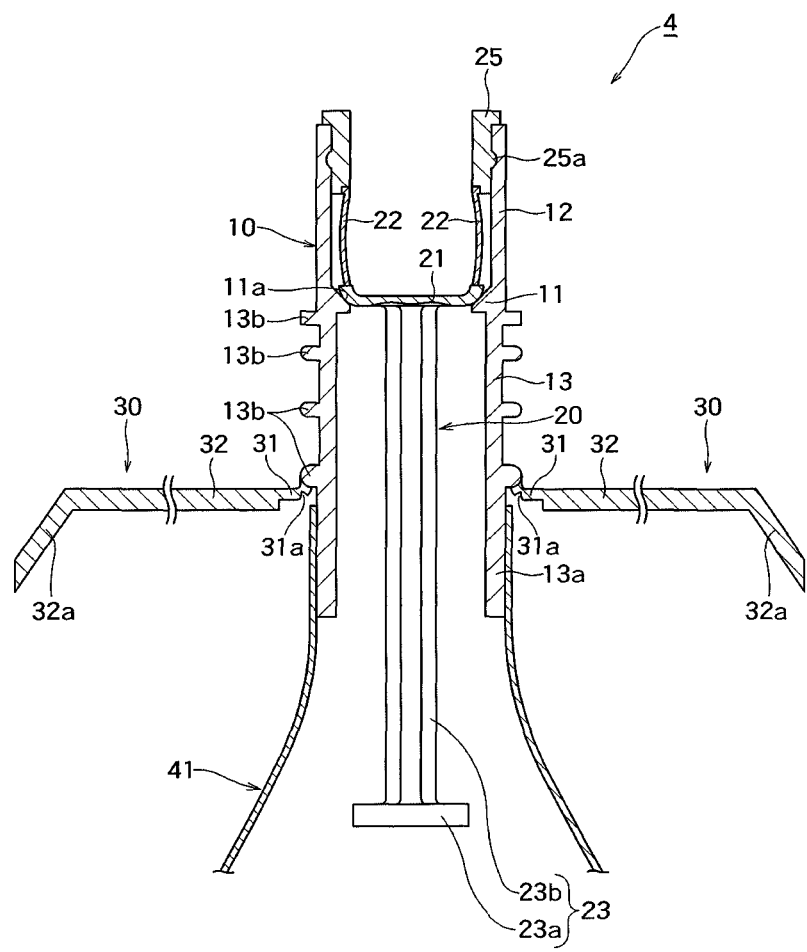
FIG. 7A is a cross sectional view of a part of a check valve and a container body according to a third modification example of the first embodiment of the present invention.
Figure 7B:
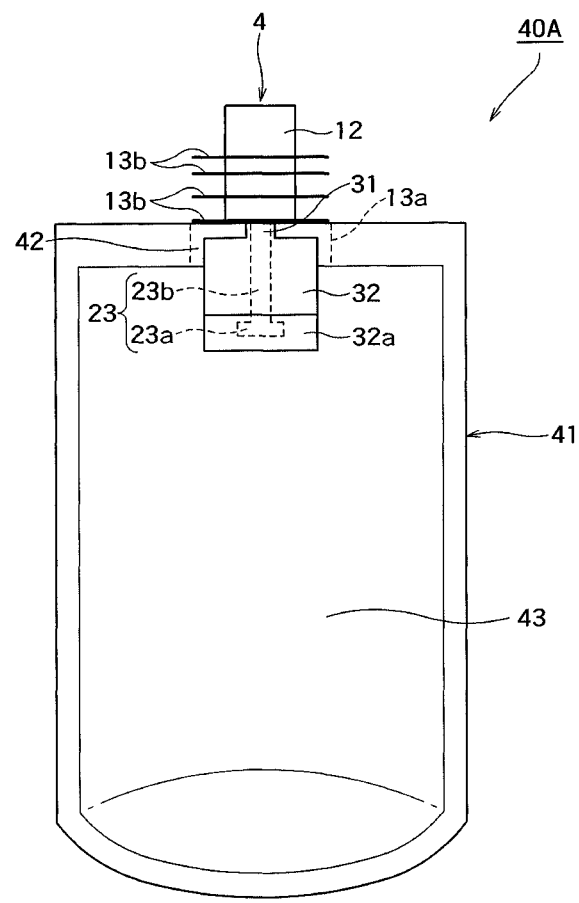
FIG. 7B is a front view of a container with a check valve according to the third modification example of the first embodiment of the present invention.

FIG. 7A is a cross sectional view of a part of a check valve 4 and a container body 41 according to a third modification example. Further, FIG. 7B is a front view of a container with a check valve 40A in which the check valve 4 according to this modification example is fixed to a spouting part 42.

The check valve 4 is different from the above described check valve 1 mainly in the disposition of the flap parts 32. That is, in the check valve 1, the flap parts 32 are supported with the housing member 10 through the hinges 31 connected to the lower end of the attachment part 13a such that they are located inside the container body 41. Whereas, in the check valve 4 of this modification example, flap parts 32 are supported with a housing member 10 such that they are located outside a container body 41. More specifically, as illustrated in FIG. 7A, the flap parts 32 are supported with the housing member 10 through the hinges 31 deformably connected to a flange part 13b.

In this manner, even in the case where the flap parts 32 are provided outside the container body 41, they can operate a pressing piece 23a while sandwiching it through the soft container body 41.

Note that the hinges 31 are not limited to the case where they are connected to the flange part 13b, and, for example, they may be connected to an attachment part 13a just below the flange part 13b.

Further, as illustrated in FIG. 7A, a notch 31a is preferably provided on the hinge 31. Thereby, the flap parts 32 can be easily tilted toward the container body 41 side after the housing member 10 is thermally fused to the container body 41.

Figure 8:
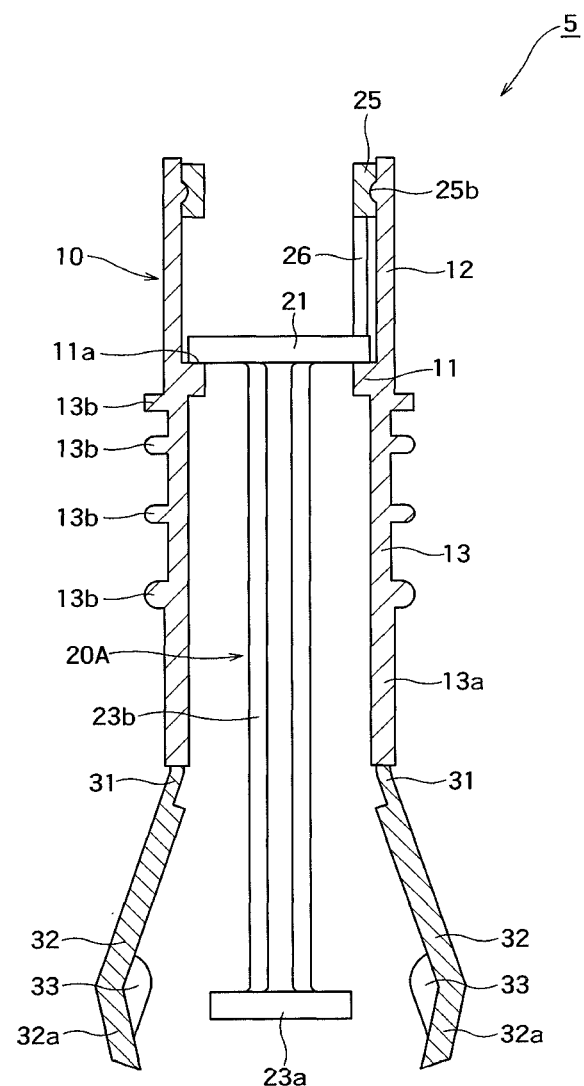
FIG. 8 is a cross sectional view of a part of a check valve according to a second embodiment of the present invention in a state that the valve is closed.
Figure 9:
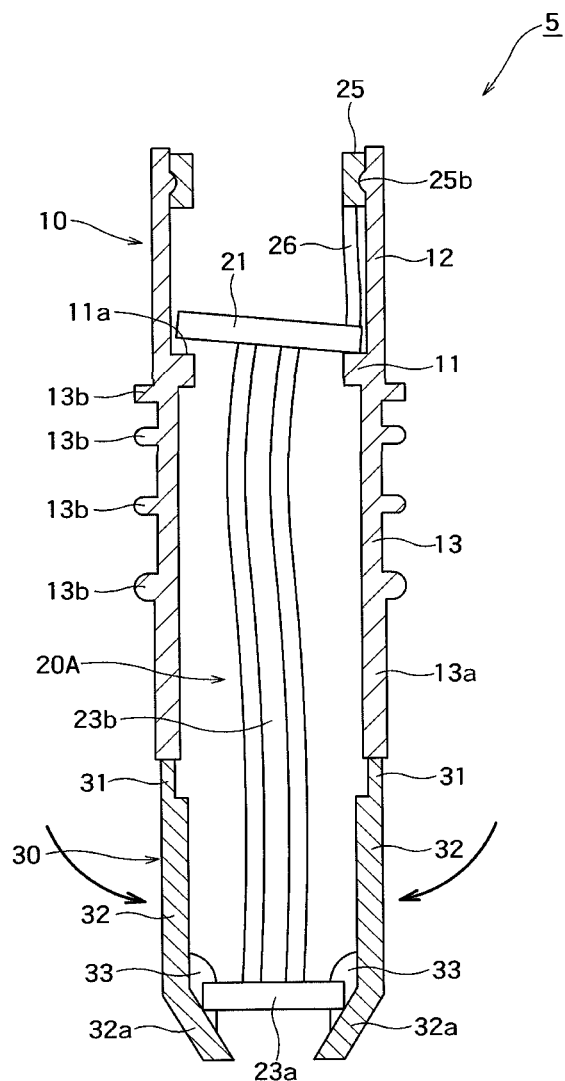
FIG. 9 is a cross sectional view of a part of the check valve according to the second embodiment of the present invention in a state that the valve is opened.
Figure 10:
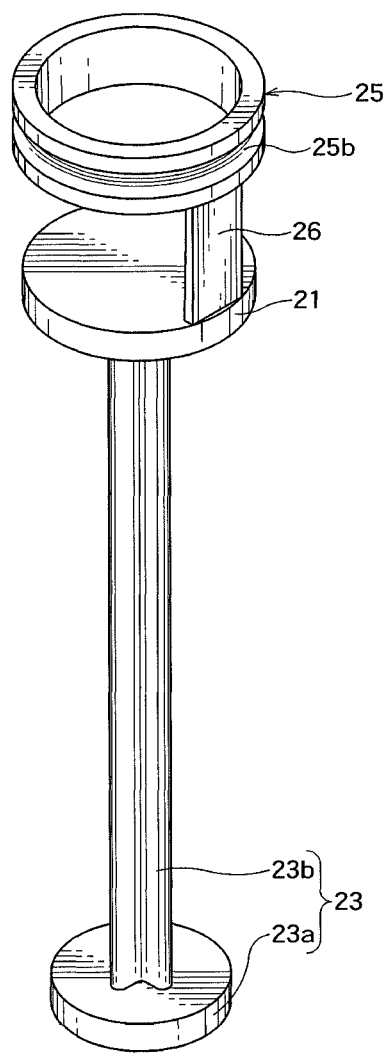
FIG. 10 is a perspective view of a valve member of a one end support type according to the second embodiment of the present invention.

Next, with reference to FIG. 8 to FIG. 10, description is given of a second embodiment of the present invention.

Second Embodiment

FIG. 8 is a cross sectional view of a part of a check valve 5 according to a second embodiment of the present invention in a state that the valve is closed. FIG. 9 is a cross sectional view of a part of the check valve 5 in a state that the valve is opened. FIG. 10 is a perspective view of a valve member 20A according to this embodiment.

The check valve 5 according to the second embodiment is different from the check valve 1 according to the first embodiment mainly in the configuration of the valve member. That is, the valve member 20A according to this embodiment is provided with only one pressing member 26 having a columnar shape or a plate shape as a pressing member as illustrated in FIG. 10. That is, the valve member 20A of this embodiment is a valve member of a so-called one end support type.

One end of the pressing member 26 is fixed to a housing member 10 on a downstream side of a fluid passage, and the other end is fixed to a peripheral portion of a valve disk 21. Further, the pressing member 26 can be flexibly curved and are preferably configured not to be bent in a buckling manner like the pressing member 22. Therefore, the pressing member 26 is, for example, formed to be thicker than the pressing member 22, or made of a hard material. Note that it is not essential for the pressing member 26 not to bend, and it may bend to some extent.

Further, a shaft 23b of the valve member 20A is preferably made of a material having flexibility and restorability (for example, synthetic resin such as polyethylene, polypropylene).

When a pair of flap parts 32, 32 are pressed from their both sides, the shaft 23b is curved like an S shape and a pressing piece 23a moves upward as illustrated in FIG. 9, and thereby the pressing member 26 is curved as illustrated in FIG. 9.

The pressing member 26 is curved in this manner, so that the valve disk 21 elastically moves apart from a seat surface 11a of a valve seat part 11 with its one side opened. That is, the peripheral portion of the valve disk 21, which is located on the other side of the peripheral portion thereof to which one end of the pressing member 26 is fixed, moves apart from the seat surface 11a. Thereby, contents can pass through the fluid passage inside the housing member 10.

Note that in this embodiment, a recess 25b is provided on an outer circumference surface of an engaging member 25 as illustrated in FIG. 8 and FIG. 10. The recess 25b is engaged with a projection provided on an inner circumference of the housing member 10, so that the engaging member 25 is undetachably fixed to the housing member 10.

Further, in the second embodiment, the shaft 23b may not be connected to the center of the valve disk 21, but may be connected to the valve disk 21 at a position eccentric from the center of the valve disk 21. Thereby, it is possible to control pressing force on the flap parts 32, which is necessary for opening the valve, and a flowing amount of the contents.

For example, the shaft 23b is connected to the valve disk 21 at a position eccentric to an opposite side of the position where the pressing member 26 and the valve disk 21 are connected. Thereby, with the smaller pressing force, the valve disk 21 can move apart from the seat surface 11a of the valve seat part 11.

Similarly, by connecting the shaft 23b to the pressing piece 23a at a position eccentric from the center of the pressing piece 23a, the above described pressing force and the flowing amount may be controlled.

Third Embodiment

Figure 11:
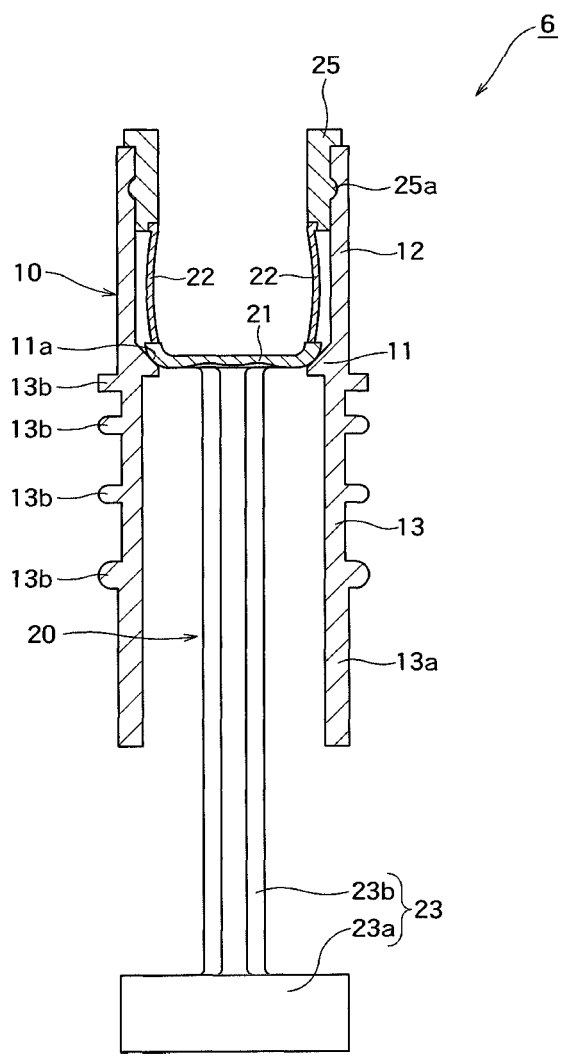
FIG. 11 is a cross sectional view of a part of a check valve according to a third embodiment of the present invention in a state that the valve is closed.

FIG. 11 is a cross sectional view of a part of a check valve 6 in a state that the valve is closed. A third embodiment is different from the first embodiment mainly in that whether the operating member 30 is included or not. That is, in the first embodiment, the operating member 30 is attached to the lower end of the housing member 10, whereas in the third embodiment, the operating member 30 is not attached.

Hereinafter, description is given of the third embodiment while focusing on the difference from the first embodiment.

As illustrated in FIG. 11, the check valve 6 according to this embodiment includes a housing member 10 and a valve member 20 disposed inside the housing member 10.

A valve driving member 23 includes a pressing piece 23a extending from the housing member 10 in a state that the valve driving member 23 is disposed inside the housing member 10 as illustrated in FIG. 11.

Further, as will be described in detail later, the pressing piece 23a is pressed up toward a valve disk 21 at the time of pouring out contents. Thereby, the valve driving member 23 drives the valve disk 21 such that it moves apart from a seat surface 11a against pressing force of pressing members 22.

Figure 12:
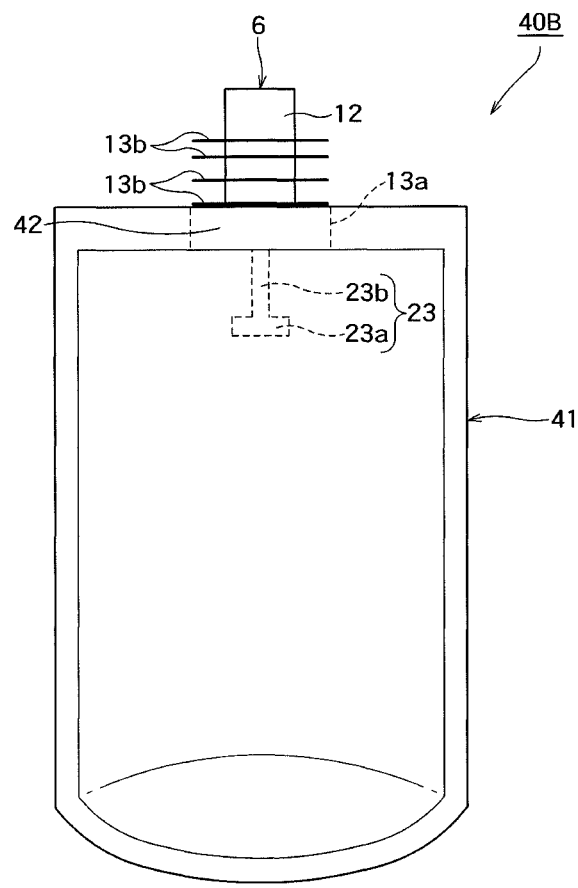
FIG. 12 is a front view of a container with a check valve according to one embodiment of the present invention.

Next, with reference to FIG. 12, description is given of a container with a check valve 40B including the above described check valve 6. FIG. 12 is a front view of the container with the check valve according to one embodiment.

The container with the check valve (spout pouch) 40B accommodates the contents, and includes a container body (pouch) 41 including a spouting part 42, and the above described check valve 6.

As illustrated in FIG. 12, the check valve 6 is thermally fused to the container body 41 to be fixed. More specifically, in the check valve 6, an attachment part 13a of a conduct tube part 13 is fixed to the container body 41 such that a mouth part 12 of the housing member 10 is exposed on the spouting part 42 of the container body 41.

Note that the container body 41 is not limited to the pouch as long as the valve driving member 23 can be operated with the fingers, and it may be any kind of container such as a blow bottle, a PET bottle, a paper container.

Figure 13:
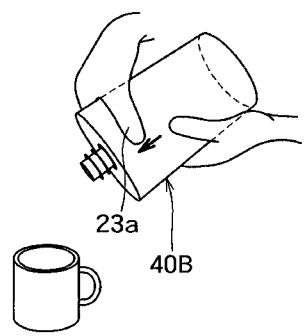
FIG. 13 is a view for illustrating one example of usage of the container with the check valve according to one embodiment of the present invention.

Next, with reference to FIG. 13, description is given of one example of usage of the container with the check valve 40B.

First, in the case where a cap (not illustrated) is attached to the mouth part 12, the cap is rotated to be removed while the joint portion (attachment part 13a) between the check valve 6 and the container body 41 is held with one hand.

Next, as illustrated in FIG. 13, one hand is attached to a side or bottom of the container body and the other hand holds the check valve 6 to turn the mouth part 12 toward a cup into which the contents are to be poured. Note that in this state, the valve disk 21 is pressed on the seat surface 11a with the pressing members 22, and thus the valve of the check valve 6 is closed. Therefore, the contents of the container body 41 are not poured out.

Next, the force is applied to the pressing piece 23a to allow the valve driving member 23 to drive the valve disk 21. More specifically, the fingers of the hand holding the check valve 6 sandwich the pressing piece 23a through the container body 41, and slide toward the mouth part 12. Thereby, the pressing piece 23a slides along an inside surface of the container body 41 to be pressed up toward the valve disk 21.

Figure 14:
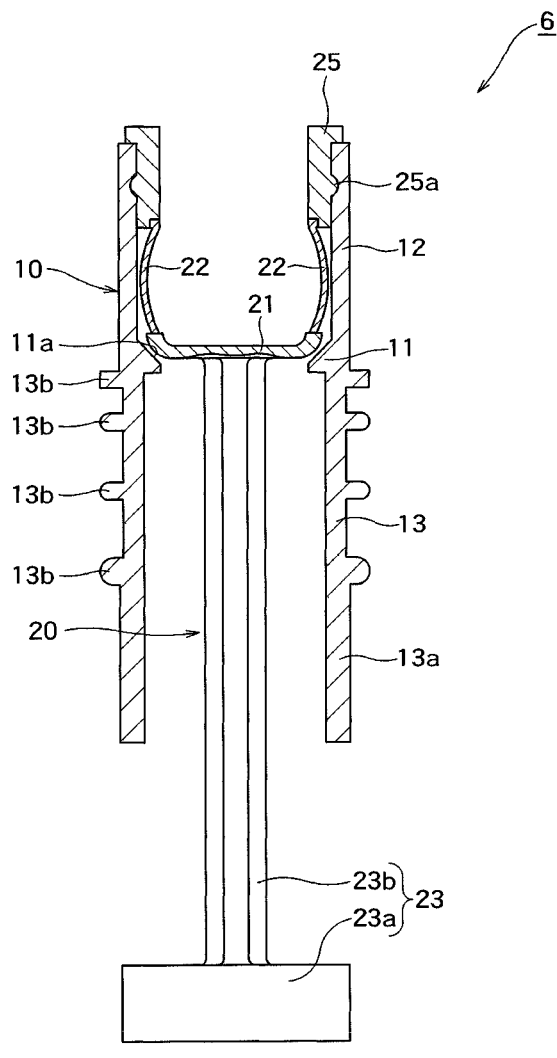
FIG. 14 is a cross sectional view of a part of the check valve according to the third embodiment of the present invention in a state that the valve is opened.
Figure 14:
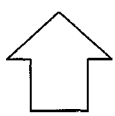

FIG. 14 is a cross sectional view of a part of the check valve 6 in a state that the valve is opened. As illustrated in FIG. 14, the pressing piece 23a is pressed up, so that the pressing members 22 are bent and the valve disk 21 elastically moves apart from the seat surface 11a of the valve seat part 11. That is, the valve disk 21 is pressed up against the pressing force of the pressing members 22, so that a gap is generated between the valve disk 21 and the seat surface 11a of the valve seat part 11. Thereby, the contents can pass through a fluid passage of the housing member 10, and thus the contents in the container body are poured into the cup.

Then, after the desired amount of the contents is poured out, the fingers sandwiching the pressing piece 23a are removed. Thereby, the pressing piece 23a goes down to its original position, and the valve disk 21 returns to a state that it is seated on the valve seat part 11, so that the pouring out of the contents is stopped. Of course, the outside air is not sucked into the inside of the container body 41 at the time of closing the valve.

Note that a size of the gap between the valve disk 21 and the seat surface 11a can be changed depending on the force applied to the pressing piece 23a. Therefore, by adjusting the force applied to the pressing piece 23a, it is possible to freely change a pouring amount or a pouring speed of the contents.

Further, by changing a shape or size of the pressing piece 23a (such as diameter of the disk member) or the like, it is possible to change the size of the gap under the same force condition.

As described above, according to this embodiment, it is not necessary to apply pressure to the container body itself at the time of pouring out the contents. Therefore, even in the case where the container has large capacity (for example, 1 to 1.5 liters), it is possible to easily keep a state that the mouth part is turned toward the cup.

Further, according to this embodiment, by adjusting the force applied to the pressing piece 23a, it is possible to freely change the pouring amount or the pouring speed of the contents. Therefore, even in the case of the small pouring amount, such as a case where the content is soy sauce, it is possible to easily adjust the pouring amount.

Further, according to this embodiment, even in the case of the container in which the internal pressure is not easily applied even if the container is pressed with the hand, such as the pouch, it is possible to easily change the pouring amount or the pouring speed of the contents.

Further, according to this embodiment, since the check valve structure uses restoring force of the pressing members, it is possible to prevent liquid dripping and entering of the outside air at the time of pouring out the contents.

In this manner, according to this embodiment, it is possible to pour out the contents at the desired pouring amount or pouring speed far easily, as compared with the case of the conventional check valve in which the internal pressure of the container is increased by applying the pressure to the container itself with the hand, and the valve is opened by pressure of the contents.

Next, description is given of modification examples of the third embodiment. Either modification example can obtain the effect described above.

Modification Example of Check Valve of Third Embodiment

Figure 15:
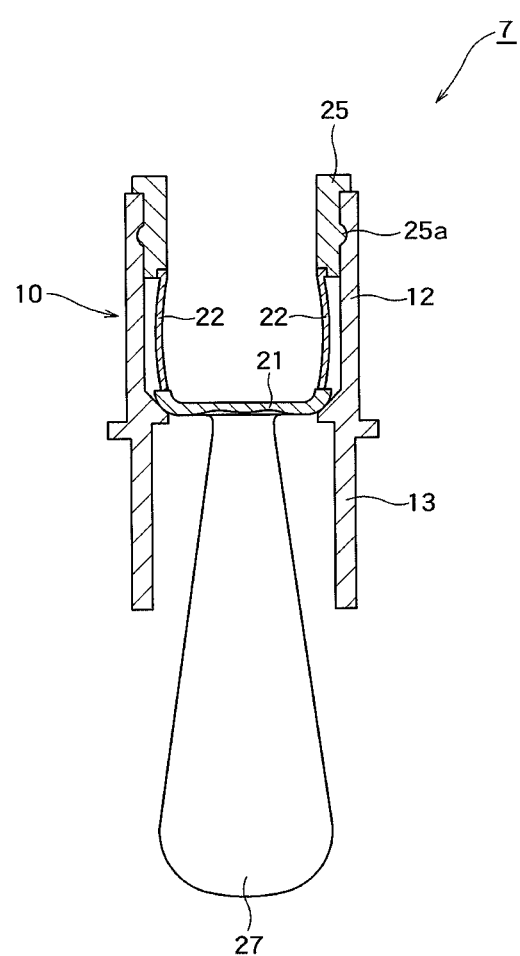
FIG. 15 is a cross sectional view of a part of a check valve according to a modification example of the third embodiment of the present invention.

Next, with reference to FIG. 15, description is given of a modification example of the check valve of the third embodiment. FIG. 15 is a cross sectional view of a part of a check valve 7 according to the modification example. The check valve 7 is different from the above described check valve 6 mainly in the configuration of the valve driving member. As illustrated in FIG. 15, a valve driving member according this modification example does not include the above described shaft 23b, and is configured as a pressing piece 27 having a substantially waterdrop shape, an upper end of which is connected to a valve disk 21.

In this manner, by forming the pressing piece itself into the substantially waterdrop shape or a long columnar shape, the shaft 23b can be omitted.

Note that the shape of the pressing piece 27 in FIG. 15 is merely one example. That is, the shape of the pressing piece 27 may be any shape as long as the pressing piece is sandwiched with the fingers through a container body 41 and can slide along an inside surface of the container body 41.

Modification Example of Container with Check Valve of Third Embodiment

Figure 16:
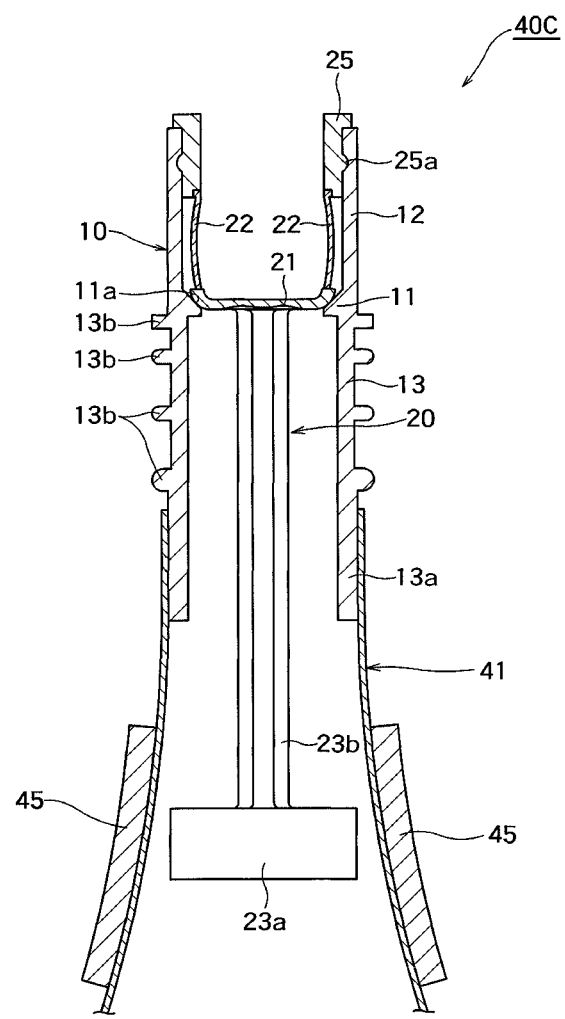
FIG. 16 is a cross sectional view of a part of a container with a check valve according to a modification example of the third embodiment of the present invention.

Next, with reference to FIG. 16, description is given of a modification example of the container with the check valve of the fourth embodiment. FIG. 16 is a cross sectional view of a part of a container with a check valve 40C according to the modification example. As illustrated in FIG. 16, the container with the check valve 40C is provided with pinching parts 45 on an outside surface of a container body 41.

The pinching parts 45 are each a plate member made of plastic, for example, and are provided such that they can sandwich a pressing piece 23a as illustrated in FIG. 16.

At the time of using the container with the check valve 40C, the fingers are put on the pinching parts 45, and then the pressing piece 23a is sandwiched with the pinching parts 45 to be slid. In this manner, the pinching parts 45 apply force to the pressing piece 23a to operate a valve driving member 23. By providing the pinching parts 45, it is possible to clarify an operation position and also improve operability of the check valve.

Note that the pinching parts 45 may be provided on an inside surface of the container body 41. In this case, an operation position displaying part 44 indicating positions of the pinching parts 45 is preferably provided on the outside surface of the container body 41.

Further, the pinching parts 45 may not be attached to the container body 41, but may be made of part of the container body 41.

For example, a predetermined area of the container body 41 may be made thicker than the other area to become the pinching parts 45.

Fourth Embodiment

Figure 17:
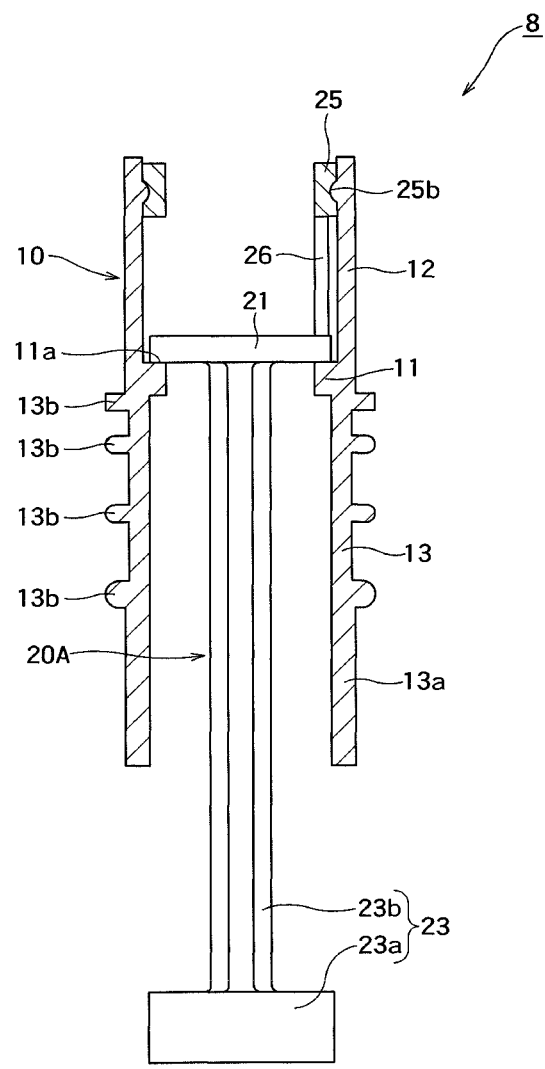
FIG. 17 is a cross sectional view of a part of a check valve according to a fourth embodiment of the present invention in a state that the valve is closed.
Figure 18:
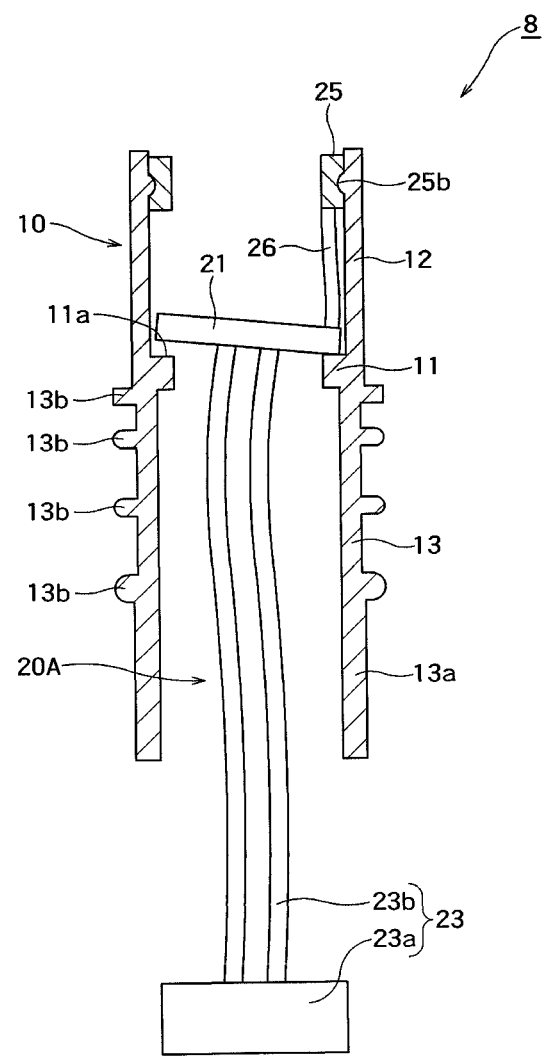
FIG. 18 is a cross sectional view of a part of the check valve according to the fourth embodiment of the present invention in a state that the valve is opened.

Next, with reference to FIG. 17 and FIG. 18, description is given of a fourth embodiment of the present invention. FIG. 17 is a cross sectional view of a part of a check valve 8 according to the fourth embodiment in a state that the valve is closed. FIG. 18 is a cross sectional view of a part of the check valve 8 in a state that the valve is opened.

The check valve 8 according to the fourth embodiment is different from the check valve 6 according to the third embodiment mainly in the configuration of the valve member. That is, a valve member of the check valve 8 is the valve member 20A of the so-called one end support type described in the second embodiment.

When a pressing piece 23a is sandwiched with the fingers to be slid along an inside surface of a container body 41, a shaft 23b is curved like an S shape and the pressing piece 23a moves upward as illustrated in FIG. 18, and thereby a pressing member 26 is curved.

The pressing member 26 is curved in this manner, so that a valve disk 21 elastically moves apart from a seat surface 11a of a valve seat part 11 with its one side opened. That is, a peripheral portion of the valve disk 21, which is located on the other side of a peripheral portion thereof to which one end of the pressing member 26 is fixed, moves apart from the seat surface 11a. Thereby, contents can pass through a fluid passage inside a housing member 10.

Further, in the fourth embodiment, the shaft 23b may not be connected to the center of the valve disk 21, but may be connected to the valve disk 21 at a position eccentric from the center of the valve disk 21. Thereby, it is possible to control force necessary for opening the valve, and a flowing amount of the contents.

For example, the shaft 23b is connected to the valve disk 21 at a position eccentric to an opposite side of the position where the pressing member 26 and the valve disk 21 are connected. Thereby, with the smaller pressing force, the valve disk 21 can move apart from the seat surface 11a of the valve seat part 11.

Similarly, by connecting the shaft 23b to the pressing piece 23a at a position eccentric from the center of the pressing piece 23a, the force applied to the pressing piece 23a and the flowing amount may be controlled.

Although those skilled in the art may conceive additional effects or various modifications of the prevent invention based on the above described description, aspects of the present invention are not limited to the respective embodiments and modification examples described above. The constituent elements in the different embodiments and modification examples may be appropriately combined. Various additions, modifications, and partial deletion can be made without departing from the conceptual idea and gist of the present invention which are derived from the contents prescribed by the claims and the equivalents thereof.

REFERENCE SIGNS LIST 1, 2, 3, 4, 5, 6, 7, 8 check valve
10 housing member
11 valve seat part
11a seat surface
12 mouth part
13 conduct tube part
13a attachment part
13b flange part
20, 20A valve member
21 valve disk 22 pressing member
23 valve driving member
23a pressing piece
23b shaft
24A, 24B passing hole
25 engaging member
25a projection
25b recess
26 pressing member
27 pressing piece
30 operating member
31 hinge part
31a notch
32 flap part
32a inclined part
32b (flap part) inner surface
33 rib
40, 40A, 40B, 40C container with check valve
41 container body
42 spouting part
43 (container body) main surface
44 operation position displaying part
45 pinching part

What is claimed is:

1. A check valve comprising:
a housing member inside which a fluid passage is formed; and
a valve member disposed inside the housing member,
the housing member including a valve seat part provided on an inner circumference surface of the housing member,
the valve member including a valve disk seated in a sealable manner on a seat surface of the valve seat part, a pressing member fixed to the housing member by an engaging member and biasing the valve disk toward the seat surface of the valve seat part, and a valve driving member connected to the valve disk and driving the valve disk against pressing force of the pressing member, and
an operating member configured to be capable of operating the valve driving member such that the valve disk of the valve member moves apart from the seat surface of the valve seat part being provided,
wherein the pressing member is provided on a downstream side of the fluid passage when viewed from the valve disk,
wherein the valve driving member includes a pressing piece, and a shaft extending from the pressing piece toward the valve disk to be connected to the valve disk,
the operating member includes a pair of flap parts facing each other supported by the housing member through hinge parts, and
the pair of flap parts include inclined parts sandwiching the pressing piece and allowing the pressing piece to slide.

2. The check valve according to claim 1, wherein the pressing member is at least two or more elastic members each having a columnar shape or a plate shape, one end of each elastic member being fixed to the housing member by an engaging member and the other end of each elastic member being fixed to a peripheral portion of the valve disk, and the pressing member bends to elastically move the valve disk apart from the seat surface of the valve seat part.

3. The check valve according to claim 1, wherein the pressing member is one elastic member having a columnar shape or a plate shape, one end of the elastic member being fixed to the housing member by an engaging member and the other end of the elastic member being fixed to a peripheral portion of the valve disk, and the elastic member is curved to elastically move the valve disk apart from the seat surface of the valve seat part with one side of the valve disk opened.

4. A container with a check valve comprising:
a container body accommodating contents and including a spouting part; and
the check valve according to claim 1,
the housing member including a cylindrical mouth part, and a cylindrical conduct tube part connecting to the mouth part, and
in the check valve, at least part of the cylindrical conduct tube part of the housing member being fixed to the container body such that the mouth part of the housing member is exposed on the spouting part of the container body.

* * * * *